July 5, 1955   F. E. OAKHILL   2,712,264
PRISM BLOCK
Filed May 11, 1950   5 Sheets-Sheet 1

Fig.1

Inventor:
Frederic E. Oakhill
By: Stice & Stice
Atty.

July 5, 1955  F. E. OAKHILL  2,712,264
PRISM BLOCK
Filed May 11, 1950  5 Sheets-Sheet 2

Inventor:
Frederic E. Oakhill
By: Lee & Lee
Attys

July 5, 1955                F. E. OAKHILL                2,712,264
                            PRISM BLOCK
Filed May 11, 1950                              5 Sheets-Sheet 3

Inventor:
Frederic E. Oakhill
By: Lee & Lee
Atty.

Inventor:
Frederic E. Oakhill

July 5, 1955 F. E. OAKHILL 2,712,264
PRISM BLOCK
Filed May 11, 1950 5 Sheets-Sheet 5

Inventor:
Frederic E. Oakhill
By: Lee & Lee
Atty.

United States Patent Office 2,712,264
Patented July 5, 1955

2,712,264

PRISM BLOCK

Frederic E. Oakhill, Wilmette, Ill., assignor to Prismacolor, Inc., Chicago, Ill., a corporation of Illinois Application May 11, 1950, Serial No. 161,437

9 Claims. (Cl. 88—1)

The invention relates generally to a prism assembly and filter structure for use in producing color separation images in connection with the reproduction of multicolored pictures.

The invention is particularly useful in connection with the production of colored pictures by means of a photographic film or other recording or transmitting mediums where it is desirable to produce a colored image by color separation and superimposition procedures.

The invention has among its objects the poduction of a prism and filter assembly which is so constructed that high precision may be obtained in the finished article so that proper frame spacing alignment and focus of the color separation images may be achieved, means being incorporated for facilitating the easy adjustment of the assembly to achieve the desired results. It is believed apparent that in optical systems of this type, relatively very fine adjustments may be required to properly position the separated images and eliminate distortion therein.

Another object of the invention is the production of such an assembly in which the component prism elements are so designed that corrections in the focal lengths of the respective images may be readily made during the mounting of the elements of the main prism assembly, and in which certain of the prism elements may be adjusted about both vertical and horizontal axes to facilitate proper framing of the multiple images.

A further object of the invention is the production of such an assembly incorporating novel means for adjustment of the respective filter elements about horizontal and vertical axes to facilitate framing of the images.

A further object of the invention is the production of such a structure which is relatively simple in construction, inexpensive to manufacture and very efficient in operation, providing the desired range of optical control through simple adjustable elements.

Many other objects and advantages of the construction herein shown and described will be obvious to those skilled in the art from the disclosure herein given.

The present invention contemplates the use of an optical system similar to that illustrated in patents to C. L. Fitz, No. 2,073,368, dated March 9, 1937, and C. L. Dixon et al., No. 2,096,425, dated October 19, 1937. Prism assemblies such as those illustrated in these patents comprise a plurality of prism blocks cemented together by suitable material into a unitary prism assembly which separates the light rays entering the assembly into three light paths whereby three images may be produced on a photographic film or other recording or transmitting medium. To achieve satisfactory results it is necessary that the three images be positioned in a common plane, or in other words, the focal lengths of the three images must be equal. This can be accomplished by varying the length of travel of the light rays of each image through air and glass as clearly explained in the later of the two reference patents. Likewise, the respective images must be similarly positioned and spaced with respect to each other to achieve uniform results with various cameras and projectors, and it is believed apparent that in an assembly such as that illustrated in the reference patents, minor adjustments of the respective prism blocks to achieve the desired results is extremely difficult as the blocks, being cemented together, must be taken apart, adjusted and re-cemented, the entire process being one of trial and error. The present invention, however, eliminates these features inherent in prior designs and enables accurate adjustments to be made in the completed assembly.

To this end my invention consists in the novel construction, arrangement and combination of parts herein shown and described, and more particularly pointed out in the claims.

In the drawings, wherein like reference characters indicate like or corresponding parts.

Figure 1:
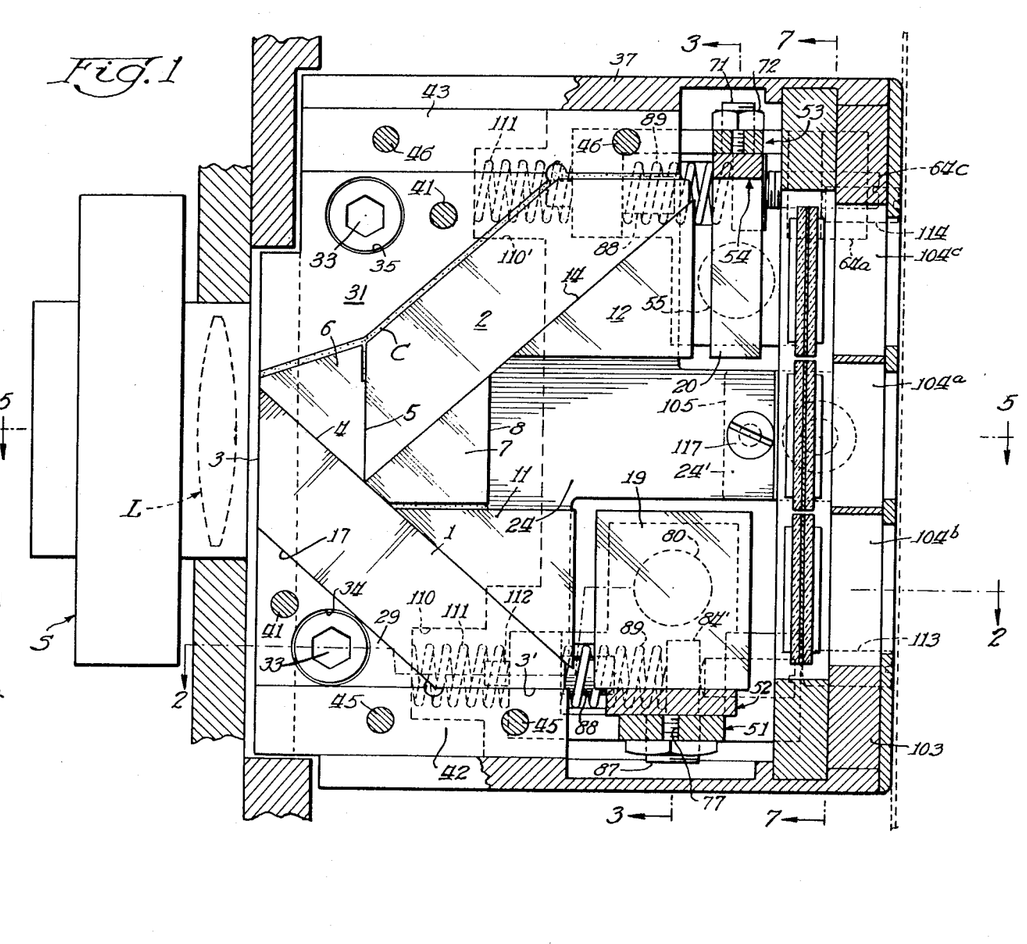
Fig. 1 is a sectional view through a prism structure embodying the present invention taken approximately on the line 1—1 of Fig. 2.
Figures 8, 9, 11:
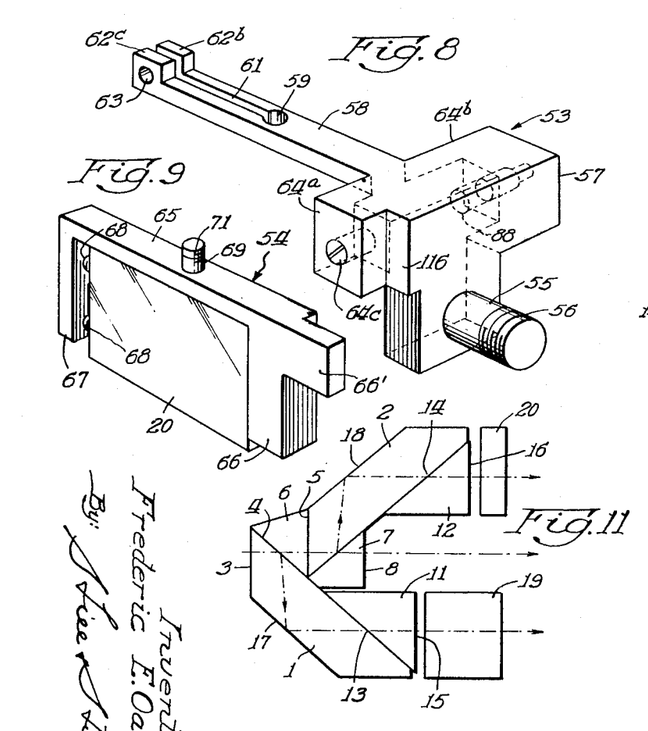
Fig. 8 is a perspective view of one of the adjustable shank members.
Fig. 9 is a perspective view of the prism holder adapted to be associated with the shank member illustrated in Fig. 8.
Fig. 11 is a diagrammatic view of the prism assembly illustrating the application of spherical corrective lens to the compensator prism block.
Figure 10:
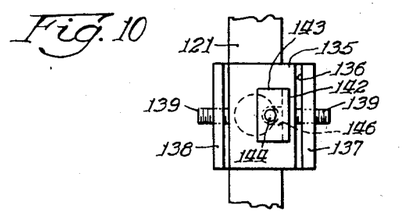
Fig. 10 is a side elevational view of the filter supporting member illustrated in section in Fig. 2.

Referring to Figs. 1 and 11, the prism assembly comprises a pair of generally trapezoidal shaped prism blocks 1 and 2, the end face 3 of the block 1 forming the light entry face of the assembly. Interposed between the adjacent face 4 of the block 1 and the end face 5 of the block 2 is a triangularly shaped prism block 6 having its adjacent faces in abutting relation with the faces 4 and 5 of the respective blocks 1 and 2. A second triangularly shaped prism block 7 having a light emerging face 8 extending substantially parallel to the face 3, is positioned in abutting relation with the face of the block 2. Associated with each of the blocks 1 and 2 are respective triangularly shaped prism blocks 11 and 12, the block 11 having a face 13 in abutting relation with the adjacent face of the block 1 and the block 12 having a face 14 positioned in abutting relation with the adjacent face of the block 2, with the respective blocks having light emerging faces 15 and 16 extending substantially parallel to the face 3.

The surface of the prism block 1 abutting the block 6 is provided with a partially reflecting surface 4, and in like manner the face of the block 2 abutting the block 7 is provided with a partially reflecting surface. In operation, light entering the prism 1 through the surface 3 is partially reflected to the outer face 17 thereof and thence substantially parallel to the light entering the assembly and through the block 11, with the non-reflected light passing through the prism block 6 into the block 2 and partially reflected to the outer face 18 of the latter and through the block 12, and thence substantially parallel to the axis of the entering light, the balance of the non-reflected light passing through the prism block 7.

As thoroughly described in Patent No. 2,096,425, due to the fact that the paths of the rays forming the side images are changed by two reflections, should the side prisms terminate in the same plane as the face 8 of the center prism 7, the two side images would be brought to a focus closer to the face 3 than the middle image. To compensate for this result, blocks 19 and 20 are interposed in the two outer light paths which are of a length to focus the two outer images in the same plane as the middle image. In this connection it will be noted that the triangularly shaped blocks 11 and 12 may be slid along the respective blocks 1 and 2, thereby increasing or decreasing the amount of glass traversed by the respective outer light paths, at the same time maintaining the faces 15 and 16 in proper alignment with the face 3, thus providing a simple and easy adjustment of the length of the outer light paths, such adjustment taking place at the time the blocks 1, 2, 6, 7, 11 and 12 are secured together.

Figure 2:
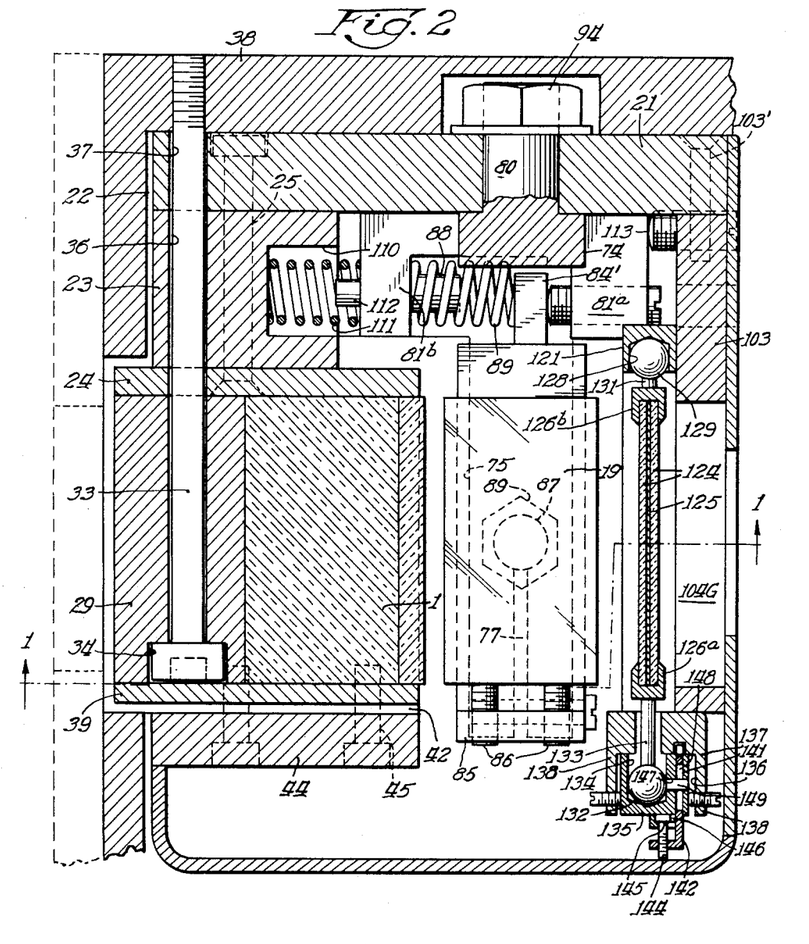
Fig. 2 is a sectional view taken approximately on the line 2—2 of Fig. 1.
Figure 3:
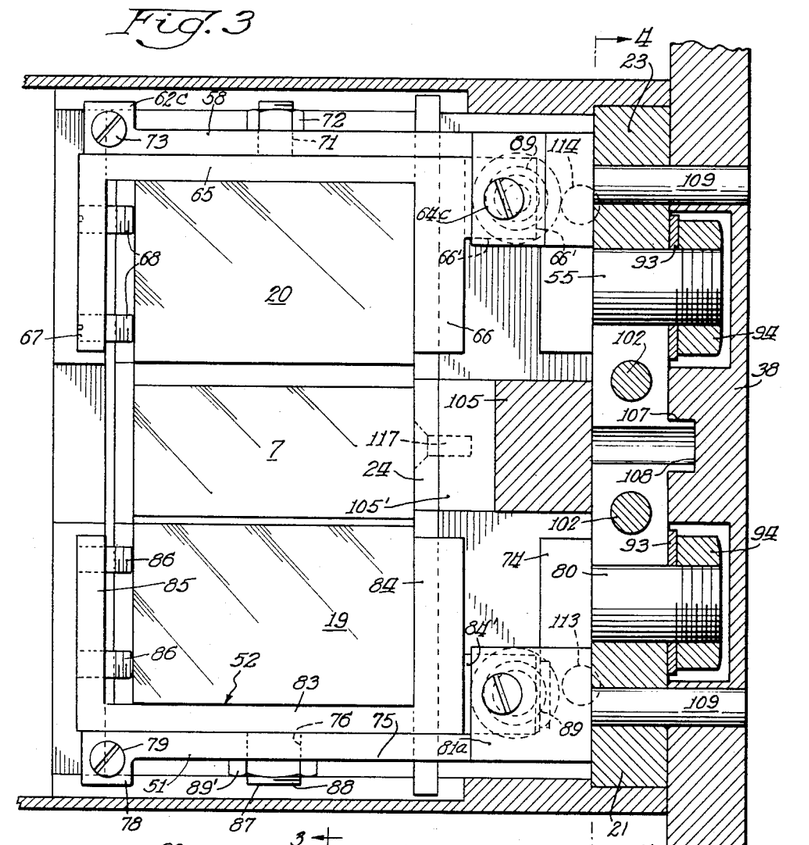
Fig. 3 is a sectional view taken approximately on the line 3—3 of Fig. 1 and Fig. 4.

Referring to Figs. 1 to 3, inclusive, the numeral 21 indicates generally a supporting plate or member for the prism assembly illustrated in Fig. 11, which, from the point of assembly may be considered a base or bottom piece to which the other elements are connected. Positioned adjacent the front edge 22 of the piece 21 is a bottom spacer block 23 to which is secured a bottom plate 24, the latter and the block 23 being secured to the bottom plate 21 by three bolts 25 and nuts 26 positioned in counter-bores 27 in the piece 21, with the bolts passing through bores 28 in the member 21. Positioned in abutting relationship to the bottom plate 24 are a pair of spacer blocks 29 and 31 which for the purposes of designation will be termed right hand block 29 and left hand block 31 with reference to the face 3 as seen in Fig. 1. The blocks 29 and 31 are secured in operative relation by respective bolts 33, the heads of which are positioned in counter-bores 34 and 35 in the spacer blocks 29 and 31, respectively, with the bolts passing through bores 36 in the bottom spacer block 23 and bores 37 in the bottom piece 21. In the embodiment of the invention illustrated, the free ends of the bolts 33 are threaded into and also form the fastening means for securing the assembly to the frame member 38 of the camera or other device in which the assembly is employed.

The prism assembly comprising blocks 1, 2, 6, 7, 11 and 12 is then positioned in abutting relationship with the bottom plate 24 between the spacer blocks 29 and 31, with the face 17 of the block 1 abutting against the adjacent face of the spacer block 29 and the end face 3′ abutting against the adjacent complementary surface of the spacer block, thus accurately positioning the prism assembly with respect to a lens L and shutter assembly S. Any gap between the prism blocks 2 and 6 and the adjoining surface of the spacer block 31 may be filled with a suitable cement or filler material indicated by the letter C.

Figure 6:
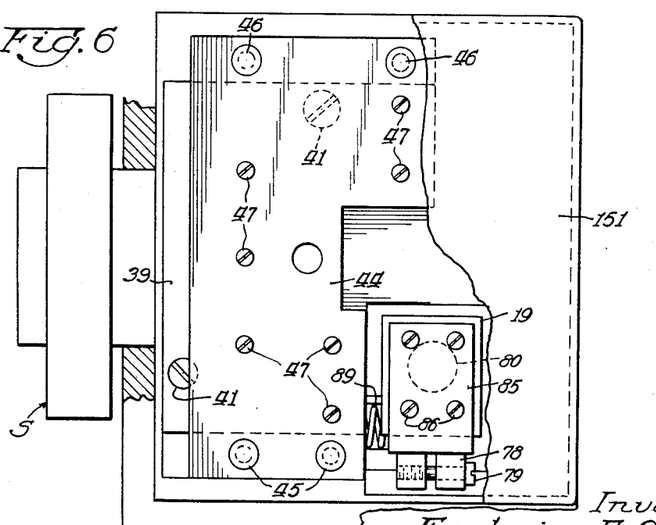
Fig. 6 is a sectional view taken approximately on the line 6—6 of Fig. 5.

Extending substantially parallel to the bottom plate 24 and overlying the exposed face of the prism assembly as seen in Fig. 2, is a top plate indicated generally by the numeral 39, secured to the spacer blocks 29 and 31 by two screws 41 threaded into the respective spacer blocks and having their heads positioned in counter-bores in the plate 39, Fig. 6.

As illustrated in Figs. 1, 2 and 3, the spacer blocks 29 and 31 are provided with outwardly offset longitudinally extending portions 42 and 43 which extend outwardly to, or slightly beyond, the outer face of the top plate 39 as clearly illustrated in Fig. 1, and secured to the portions 42 and 43 is a top piece indicated generally by the numeral 44, the latter being secured to the spacer blocks by screws 45 passing through the piece 44 and threaded into the portion 42 of the block 29 and screws 46 threaded into the portion 43 of the block 31. Threaded into the top piece 44 are a plurality of set screws 47, Figs. 5 and 6, adapted to be tightened down on the relatively thin plate 39, whereby the latter is urged into firm engagement with the prism blocks.

The compensator blocks 19 and 20 are each supported from the base or bottom piece 21 for adjustment about horizontal and vertical axes. The mounting means for these prism blocks are generally similar in construction and comprise a shank member adapted to be pivotally mounted in the base piece 21, each shank member having a prism holder pivotally mounted on the shank member with the pivotal axis of the prism holder extending at right angles to and intersecting the axis of the shank member.

Referring to Figs. 1, 2, 3, 8 and 9, the numeral 51 indicates generally a shank member for the prism 19 on which is mounted a prism holder 52. In like manner the numeral 53 indicates generally the shank holder and numeral 54 the prism holder for the prism 20. Fig. 8 illustrates the shank member 53 and Fig. 9 the prism holder 54 for the block 19, and as shown in these figures, the member 53 is provided with a mounting stud 55 extending therefrom provided with external threads 56. Extending outwardly from the base portion 57 of the member 53 is an arm 58 having a bore 59 therein, the axis of which extends at right angles to and substantially intersects the axis of the stud 55. The extreme end of the arm 58 is bifurcated with the slot 61 intersecting the bore 59 and the free ends of the arm are provided with ears 62a and 62b, the ear 62a having a bore 63 therein and the ear 62b having an internally threaded bore axially aligned with the bore 63. The base portion 57 is also provided with spaced parallelly extending projections 64a and 64b, the projection 64a having a set screw 64c threadedly mounted therein.

The prism holder 54 is generally C-shaped having a base portion 65, from the opposite ends of which extend parallel legs 66 and 67, the latter being spaced a sufficient distance to permit insertion of the prism 20 therebetween, as clearly illustrated in Fig. 9, the prism being held by any suitable means, as for example, set screws 68 threaded into the leg 67, and adapted to be drawn down against the adjacent end face of the prism block 20, thus clamping the latter between the leg 66 and the screws 68. Extending from the base portion 65 is a stud 69 having external threads 71 thereon, the stud 69 being of a size to be positioned in the bore 59 in the shank member 53, a cooperating nut 72 being threaded upon the end of the stud as illustrated in Fig. 3. The prism holder 54 may be rigidly locked to the shank member 53 by a headed screw 73 extending through the bore 63 and threaded into the ear 62b, so that by tightening down of the screw 73, the ears 62a and 62b are urged toward one another to exert a clamping force on the stud 69.

The shank member 51 and prism holder 52 are constructed similarly to the shank member 53 and holder 54, the proportions, however, being selected to accommodate the larger prism block 19, and as illustrated in Figs. 1, 2, and 3, the shank member 51 comprises a base portion 74 from which extends an arm 75 provided with a bore 76 therein, the free end of the arm being bifurcated with the slot 77 intersecting the bore 76 with the extreme ends of the arm being provided with ears 78 corresponding to the ears 62a and 62b, and provided with means for receiving the stud screw 79, such means being constructed similar to that described with respect to the shank member 53. Likewise, extending outwardly from the base portion 74 is an externally threaded stud 80, and the portion 74 is provided with spaced, parallelly extending projections 81a and 81b, the projection 81a having a set screw 82 threadedly mounted therein. The prism holder 52 is generally C-shaped comprising a base portion 83, from the opposite ends of which extend legs 84 and 85 which are spaced apart a sufficient distance to permit the reception of the prism block 19 therebetween, with the leg 85 having a plurality of set screws 86 threadedly mounted therein which may be tightened down on the adjacent surface of the prism block 19 to firmly clamp the latter between the set screws and the leg 84. Extending from the base portion 83 is a stud 87 provided with threads 88 thereon, the stud being of a size to be inserted in the bore 76 of the shank member 51, a nut 89' being threaded on the stud 87. The holder may be firmly locked to the shank member by tightening of the screw 79, thus clamping the stud 87 in the bore 76.

The holder 54 is provided with an extension 66' and the holder 52 is provided with an extension 84' adapted to be respectively positioned between the projections 64a and 64b of the shank member 53 and the projections 81a and 81b on the shank member 51, the latter being clearly illustrated in Fig. 2 of the drawings. Each of the projections 64b and 81b are provided with a pin 88 which form guides for respective springs 89, one end of each spring bearing against the respective projections on the shank member and the opposite ends bearing on the projection 66' or 84', thereby urging the respective projection 66' or 84' toward the respective projection 64a or 81a, and by adjustment of the set screw 64c or 82, Fig. 8, the respective prism holders may be adjusted about the axis of their respective studs 69 or 87 after which they may be clamped in their desired positions of adjustment by means of the screws 73 and 79. It will be noted that the main locking action of the holders relative the shank members is accomplished by the screws 73 and 79 with the nuts 72 and 89 on the respective studs, merely maintaining the holders in proper relationship with respect to the shank members.

Figure 4:
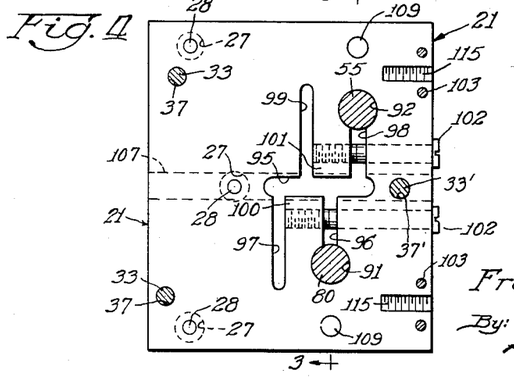
Fig. 4 is a sectional view taken approximately on the line 4—4 of Fig. 3.

As clearly illustrated in Fig. 4, the bottom piece 21 is provided with a bore 91 of a size to receive the threaded stud 80 on the shank member 51, and a similar bore 92 of a size to receive the stud 55 on the shank member 53, the shank members being held in the general positions illustrated in Fig. 3 by washers 93, and nuts 94 threaded on the respective studs. As disclosed in Fig. 4, the bottom piece 21 is provided with a slot 95 which is intersected by two pairs of parallel slots 96 and 97, and 98 and 99, with the slots 96 and 98 respectively intersecting the bores 91 and 92. The respective slots thus form clamping portions 100 and 101 operative to rigidly lock the studs 80 and 55 to the bottom piece 21, this being accomplished by headed screws 102 positioned in longitudinally extending bores in the piece 21 and threaded into the clamping portions 100 and 101. Thus, the shank members 51 and 53 may be rotated about the axes of their respective studs and locked in any adjusted positions by means of the screws 102.

Figure 5:
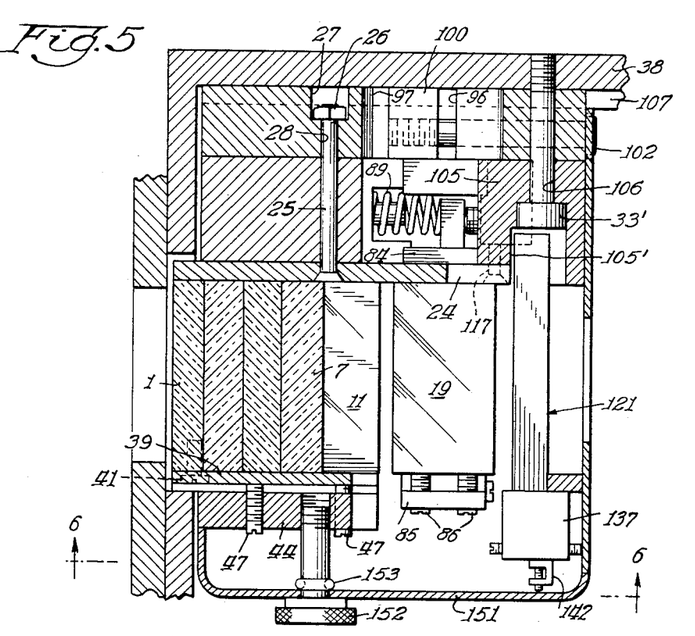
Fig. 5 is a sectional view taken approximately on the line 5—5 of Fig. 1.

Secured to the base piece 21 and the frame 38, and extending transversely thereto across the rear of the prism assembly is an aperture support piece indicated generally by the numeral 103 having apertures 104a, 104b and 104c for the respective paths of light passing through the prism assembly. As illustrated in Figs. 1 and 5, the piece 103 is provided with a centrally positioned extension 105, the latter having a bore 106 therein in which is positioned a bolt 33' which passes through the bore 37' in the bottom piece 21 and is threaded into the frame 38, the screw 33' cooperating with the screws 33 to secure the base piece to the frame member as well as secure the aperture support piece 103 thereto, the bottom piece 23 being securely held in the desired relation with respect to the frame 38 by a rib 107 on the piece 23 positioned in a complementary groove or channel 108 in the frame 38, and by pins 109 passing through the piece 23 and the frame 38, Fig. 3.

As illustrated in Figs. 1 and 2, the bottom spacer block 23 is provided with a pair of bores 110 and 110' in which are positioned springs 111 which bear against the respective portions 81b and 64b of the shank members 51 and 53, guide pins 112 being carried by the respective projections for maintaining springs in proper position. The springs 111 are operative to urge rotation of the shank members about the axes of their respective studs, and such rotational movement is limited by a pair of set screws 113 and 114 threaded partially into the bottom piece 21 and aperture support piece 103, the threaded portions in the bottom piece 21 being indicated at 115. The set screw 113 bears against the adjacent end face of the shank member 51 as clearly illustrated in Fig. 2, and the set screw 114 bears against the face 116 of the shank member 53, the relative positions of the set screws 113 and 114 being indicated in dotted lines in Fig. 3, the screws, however, not actually showing in the section as taken.

As illustrated in Figs. 1, 3 and 5, the bottom plate 24 is provided with a centrally located extension 24' which is secured to portion 105 of the support aperture piece 103, the portion 105 being laterally and outwardly offset as indicated at 105' which is in abutting relation to the portion 24' of the plate 24, the latter being secured to the portion 105' by a screw 117.

Figure 7:
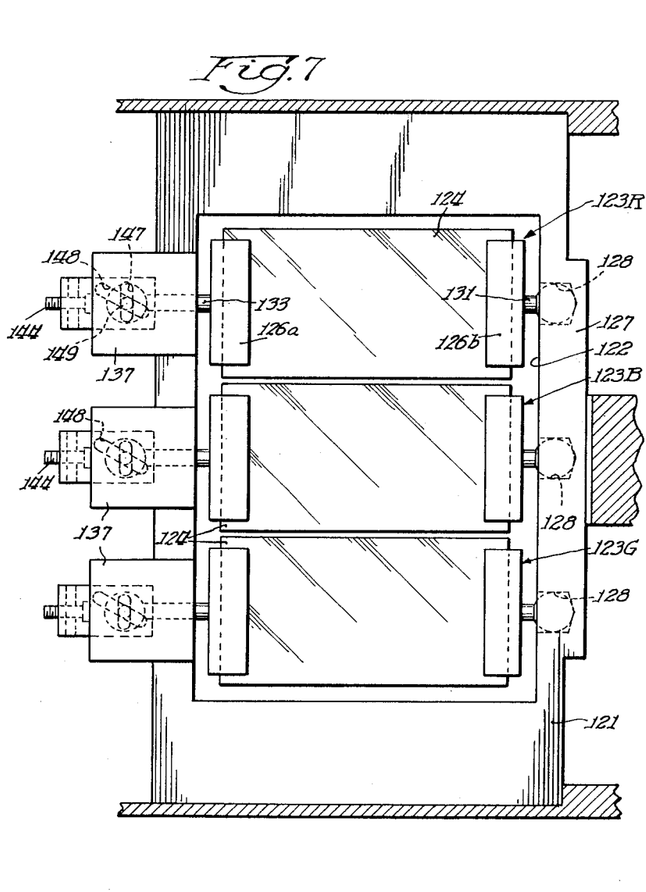
Fig. 7 is a sectional view taken approximately on the line 7—7 of Fig. 1.

Referring to Figs. 1, 3 and 7, extending across the aperture support piece 103 is a filter assembly comprising a supporting frame indicated generally by the numeral 121, having a generally rectangularly shaped opening 122 of a size to receive three filter elements indicated generally by numerals 123R, 123B and 123G. The element 123R, for example, may comprise the red filter, 123B the blue filter and 123G the green filter, each filter, in the embodiment of the invention illustrated, consisting of a pair of transparent plates 124 between which is positioned a suitable gelatin or other filter sheet 125. Each pair of plates 124 and filter 125 is cemented or otherwise suitably secured at opposite edges to respective channel shaped members 126a and 126b.

As clearly illustrated in Figs. 2 and 7, the side portion 127 of the frame 121 is provided with a plurality of bores 128 each adapted to receive a ball 129 carried by each of the respective members 126b by means of a neck or stem 131. The respective holders 126a are each supported through a ball 132 connected to the respective member 126a by an elongated neck or stem 133, each ball being positioned in the bore 134 of a rectangularly shaped block 135 positioned in a channel 136 formed in each of the enlarged portions 137 forming part of the frame 121. Each block 135 is supported between the outwardly extending portions 138 formed by the channel 136, by set screws 139 threaded into the portions 138 and bearing on the adjacent side walls of the block 135, and it will be apparent that as the channel 136 is greater in width than the corresponding dimension of the block 135, by backing off one of the set screws 139 and tightening up on the other set screw, the block may be shifted transversely with respect to the plane of the support piece 121 and locked in any desired position of adjustment. Thus, by adjusting the set screws 139, the respective filter elements may be rotated about an axis passing through the center of the three balls 129. Likewise, the blocks may be longitudinally shifted slightly in the channel 36 to provide an adjustment at right angles to that just described.

Each block 135 is provided with a relatively narrow slot 141 in which is slidably mounted a plate 142, the latter having a transversely extending portion 143 in which is threaded a screw 144, the head 145 of the latter being rotatably mounted in a slot 146 formed in the block 135, whereby axial movement of the screw 144 is prevented but free rotation of the screw permitted, so that by rotating the screw 144 in the proper direction, the plate 142 may be moved outwardly or inwardly with respect to the block 135. As clearly illustrated in Fig. 7, the block 135 is provided with a vertically extending channel or passageway 147 and each plate with a diagonally extending slot 148, and extending from each ball 132 and positioned in the slots 147 and 148 is a pin 149. It will be apparent that in view of the angularity between the slots 147 and 148, movement of the plate 142 relative to the block 135 will result in rotation of the ball 132 and with it the filter element associated therewith about an axis passing through the centers of the balls 129 and 132. Thus, each filter element may be adjusted about three axes extending at right angles to one another providing additional adjustment for framing the images passing through the prism assembly.

Suitable side, rear and front plates or covers may be provided to enclose the assembly in the finished camera or other device, and in the embodiment of the invention illustrated, the cover 151 could be secured in place by a thumb screw 152 passing through the cover and threaded into the top piece 44, the thumb screw 152 being rotatably attached to the cover by a spring clip 153.

In assembling the device above described, the prism blocks 1, 2, 6, 7, 11 and 12 are secured to one another to form the relatively fixed prism structure, suitable cement as for example, Canadian Balsam being employed. The blocks 11 and 12 may be the last blocks of such assembly to be mounted, and as previously mentioned, these blocks may be slid along the respective contacting faces 13 and 14 of the blocks 1 and 2 to provide a desired adjustment of the length of travel through glass of the respective two outer light rays, following which the blocks are cemented in the desired positions. In this connection, suitable optical equipment may be utilized to determine the exact positions desired of the two blocks 11 and 12. The bottom piece 21, bottom spacer block 23, and bottom plate 24 are then secured together by the bolts 25 and nuts 26, following which the prisms 19 and 20 may be mounted in their respective holders 52 and 54, and the latter, in turn, mounted in their respective shank members 51 and 53 with the springs 89 and set screws 82 being assembled in the operative positions illustrated. The aperture support piece 103 may then be placed in position and secured to the bottom plate 24 by screw 117' and to the bottom piece 21 by screws 103' positioned at either side of the threaded portions 115, set screws 113 and 114 subsequently being positioned in their respective threaded bores.

Following the assembly of the prisms 19 and 20 and their respective supporting elements, the shank members 52 and 54 may be mounted on the bottom piece 21 by means of nuts 94 and washers 93, after which the bottom piece 21 is secured to the frame member 38 by means of the bolts 33, right and left hand spacer blocks 29 and 31 being mounted at the same time. In like manner screw 33' may be mounted connecting the aperture support piece 103 and bottom piece 21 to the frame 38. The relatively fixed prism structure may then be placed between the spacer blocks 29 and 31, with the faces 17 and 3' of the blocks 1 seated on the adjacent faces of the blocks 29, and any filling material C required is inserted between the adjacent faces of the blocks 2 and 7, and the faces of the spacer block 31. Thus the block 29 accurately aligns the fixed prism structure with the other elements carried by the bottom piece 21.

Following this operation, the top plate 39 is secured to the spacer blocks by screws 41, and over the latter plate is positioned the top piece 44, which is mounted to the block 29 by screws 45, and block 31 by screw 46. After the bottom piece 44 has been secured to the blocks, set screws 47 may then be drawn down against the plate 39 to place pressure thereon and firmly clamp the prism assembly between the two plates 24 and 39. The prism blocks 19 and 20 may then be adjusted with respect to the fixed prism structure by adjustment of the screws 82, 113 and 114, the aperture support piece 103 being provided with suitable openings through which the screws 82 are accessible. Similarly the complete filter assembly may then be mounted adjacent the piece 103, and minor adjustments of the respective filters made, following which the assembly is ready for operation.

It will be noted from the above description that I have provided a prism and filter assembly capable of ready adjustment to produce the desired results; also that I have provided a novel prism assembly in which certain components thereof may be readily adjusted during assembly to properly adjust the focal lengths of the light rays passing through the two outer portions of the prism assembly.

Having thus described my invention, it is obvious that various immaterial modifications may be made in the same without departing from the spirit of my invention; hence, I do not wish to be understood as limiting myself to the exact form, construction, arrangement, and combination of parts herein shown and described or uses mentioned.

What I claim as new and desire to secure by Letters Patent is:

1. In a light separation prism assembly for separating light rays into three light paths, a pair of generally trapezoidal prism blocks including partial reflecting surfaces, one end face of each constituting the light entry face thereof and one side of each of said blocks serving as an internally reflective surface, said blocks being arranged transversely to one another with said light entry faces extending in spaced substantially parallel planes, and intersecting a common optical axis, the face of the foremost block constituting the light entry face of the assembly, a triangular prism having one end face abutting the end face of the rearmost of said trapezoidal prisms and another end face abutting the adjacent face of the first of such prisms, a second triangular prism having a rear face constituting a light exit face, positioned in a plane extending substantially parallel to said first-mentioned planes, and intersecting said axis, the front face of said last-mentioned prism abutting the adjacent face of the rearmost of said pair of prisms, a partial light reflecting surface between the latter pair of abutting faces and between the abutting faces of said first trapezoidal prism and the first-mentioned triangular prism, and a pair of triangular prisms each having a front face abutting a respective trapezoidal prism opposite said first-mentioned internally reflective surface and each having a rear face constituting a light exit face positioned in a plane extending substantially parallel to said first-mentioned planes with the respective optical axes of said last-mentioned faces being laterally spaced from said first axis.

2. In a light separation prism assembly for separating light rays into three light paths, a pair of generally trapezoidal prism blocks including partial reflecting surfaces, one end face of each constituting the light entry face thereof and one side of each of said blocks serving as an internally reflective surface, said blocks being arranged transversely to one another with said light entry faces extending in spaced substantially parallel planes, and intersecting a common optical axis, the face of the foremost block constituting the light entry face of the assembly, the surface opposite the entrance face of each of the trapezoidal prisms being partially reflecting, and a pair of triangular prisms each having a front face abutting a respective trapezoidal prism opposite said first-mentioned internally reflective surface and each having a rear face constituting a light exit face positioned in a plane extending substantially parallel to said first-mentioned planes with the respective optical axes of said last-mentioned faces being laterally spaced from said first axis.

3. In a light separation prism assembly for separating light rays into three light paths, a pair of generally trapezoidal prism blocks including partial reflecting surfaces, one end face of each constituting the light entry face thereof and one side of each of said blocks serving as an internally reflective surface, said blocks being arranged transversely to one another with said light entry faces extending in spaced substantially parallel planes, and intersecting a common optical axis, the face of the foremost block constituting the light entry face of the assembly, the surface opposite the entrance face of each of the trapezoidal prisms being partially reflecting, a pair of triangular prisms each having a front face abutting a respective trapezoidal prism opposite said first-mentioned internally reflective surface and each having a rear face constituting a light exit face positioned in a plane extending substantially parallel to said first-mentioned planes with the respective optical axes of said last-mentioned faces being laterally spaced from said first axis, and a pair of compensator blocks adapted for adjusting the images of the outer light paths in the same plane as the middle image, each positioned adjacent one of said last-mentioned rear faces of the triangular-shaped prism blocks and interposed in the path of light emerging therefrom.

4. An assembly adapted for producing color separation images comprising a bottom base piece, a bottom plate, a bottom spacer block interposed between said base piece and plate, a top plate, a relatively fixed prism assembly positioned between said plates and adapted for the separation of light rays into three light beams along parallel light paths, spacer blocks positioned between said plates at either side of said prism assembly, a top piece overlying said top plate, securing means for securing said elements together into a substantially rigid structure, a plurality of set screws threaded into said top piece and engageable with said top plate for applying pressure on the latter in a direction to urge said top plate into engagement with said prism assembly, said base piece being provided with a pair of openings therein having parallel axes and slots operatively connecting the openings to form clamping portions adjacent each of said openings, a pair of shank members, each pivotally mounted in a respective opening, screw means operatively mounted in the bottom base piece for engaging the respective clamping portions for maintaining said shank members in any of their respective adjusted positions, a prism holder pivotally mounted on each of said shank members contiguous to the prism assembly, a compensator prism mounted in each respective prism holder and in each of the outer light paths from the fixed prism assembly, each of the latter being rotatable relative to their respective shank members on an axis extending at right angles to and passing through the axis of its shank member, and means for maintaining each prism holder in any of its adjusted positions relative to its respective shank member whereby each of the compensator prisms is adapted to be adjusted so that the images of the outer light paths are in the same plane as the middle image.

5. An assembly for use with a lens and adapted for producing color separation images comprising a bottom base piece, a bottom plate, a bottom spacer block interposer between said base piece and plate, a top plate, a relatively fixed prism assembly including trapezoidal prisms and triangular prisms operatively positioned between said plates and adapted for the separation of light rays into three light beams along parallel light paths, spacer blocks positioned between said plates at either side of said prism assembly, securing means for securing said elements together into a substantially rigid structure, said base piece being provided with a pair of openings therein formed with parallel axes, and slots operatively connecting the openings to form clamping portions adjacent each of said openings, a pair of shank members, each pivotally connected in a respective opening, resilient means operatively connected to the bottom spacer block and associated with the respective shank members tending to rotate the same about its pivotal axis, screw means associated with each shank member opposing such pivotal movement thereof, screw means operatively mounted in the bottom base piece for engaging the respective clamping portions for maintaining said shank members in any of their respective adjusted positions, a prism holder pivotally mounted on each of said shank members contiguous to the prism assembly and adapted for adjusting the images of the outer light paths in the same plane as the middle image, a compensator prism operatively mounted in each respective prism holder and in each of the outer light paths from the fixed prism assembly, each of the latter being rotatable relative to their respective shank members on an axis extending at right angles to and passing through the axis of its shank member, resilient means associated with each prism holder and the shank member carrying the same tending to rotate such holder about its pivotal axis, screw means associated with the respective holders and shank members opposing such pivotal movement of the holders, and each of said prism holders and shank members comprising complementally formed clamping means for locking each prism holder in any of its adjusted positions relative to its respective shank member whereby each of the compensator prisms is adapted to be adjusted so that the images of the outer light paths are in the same plane as the middle image.

6. An assembly for use with a lens and adapted for producing color separation images, comprising a bottom base piece, a bottom plate, a bottom spacer block interposed between said base piece and plate, a top plate, a relative fixed prism assembly operatively positioned between said plates and adapted for the separation of light rays into three light beams along parallel light paths, spacer blocks positioned between said plates at either side of said prism assembly, a top piece overlying said top plate, securing means for securing said elements together into a substantially rigid structure, a plurality of set screws threaded into said top piece and engageable with said top plate for applying pressure on the latter in a direction to urge said top plate into engagement with said prism assembly, said base piece being provided with a pair of openings therein having parallel axes, and slots associated with said openings and adapted to form clamping portions adjacent each of said openings, a pair of shank members, each pivotally mounted in a respective opening, resilient means operatively connected to the bottom spacer block associated with the respective shank members tending to rotate the same about its pivotal axis, an aperture support piece mounted on the bottom plate, screw means mounted on the aperture support piece and associated with each shank member opposing such pivotal movement thereof, screw means mounted in the bottom base for operatively engaging the aforesaid respective clamping portions for maintaining said shank members in any of their respective adjusted positions, a prism holder pivotally mounted on each of said shank members contiguous to the prism assembly, a compensator prism operatively mounted in each respective prism holder and in each of the outer light paths from the fixed prism assembly, the latter being rotatable relative to their respective shank members on an axis extending at right angles to and passing through the respective axes of said shank members, resilient means associated with each prism holder and the shank member carrying the same tending to rotate such holder about its pivotal axis, screw means associated with the respective holders and shank members opposing such pivotal movement of the holders, and each of said prism holders and shank members comprising complementally formed clamping means adapted for locking each prism holder in any of its adjusted positions relative to its respective shank member whereby each of the compensator prisms is adapted to be adjusted so that the images of the outer light paths are in the same plane as the middle image.

7. An assembly for use with a lens and adapted for producing color separation images comprising a bottom base piece, a bottom plate, a bottom spacer block interposed between said base piece and plate, a top plate, a relatively fixed prism assembly operatively positioned between said plates and adapted for the separation of light rays into three light beams along parallel light paths, spacer blocks positioned between said plates at either side of said prism assembly, a top piece overlying said top plate, securing means for securing said elements together into a substantially rigid structure, a plurality of set screws threaded into said top piece and engageable with said top plate for applying pressure on the latter in a direction to urge said top plate into engagement with said prism assembly, said base piece provided with a pair of openings therein having parallel axes, and slots associated with said openings and adapted to form clamping portions adjacent each of said openings, a pair of shank members, each pivotally mounted in a respective opening, an expansion spring operatively associated with the bottom spacer block and with each of the respective shank members, each spring bearing at one end on said bottom spacer block and at the other adjacent its respective shank member at a point spaced from the pivotal axis thereof, and tending to rotate such shank member about its pivotal axis, screw means associated with said base piece and engageable with the respective shank members to oppose such pivotal movement thereof, screw means carried by said base piece and operatively engaging the respective clamping portions for maintaining said shank members in any of their respective adjusted positions, a prism holder pivotally mounted on each of said shank members contiguous to the prism assembly, a compensator prism operatively mounted in each respective prism holder and in each of the outer light paths from the fixed prism assembly, the latter being rotatable relative to their respective shank members on an axis extending at right angles to and passing through the axis of its shank member, an expansion spring associated with each prism holder and the shank member carrying the same, each spring bearing at one end on its respective holder and at the other end on the respective shank member, tending to rotate such holder about its pivotal axis, screw means carried by each shank member and engageable with the respective holder to oppose such pivotal movement of the latter, and complementally formed clamping means provided by each of said prism holders and shank members adapted for locking each prism holder in any of its adjusted positions relative to its respective shank member whereby each of the compensator prisms is adapted to be adjusted so that the images of the outer light paths are in the same plane as the middle image.

8. In a light separation prism assembly for use with a lens and adapted for the separation of light rays into three light paths comprising a pair of generally trapezoidal prism blocks including partial reflecting surfaces, one end face of each constituting the light entry face thereof, said blocks being arranged transversely to one another with said light entry faces extending in spaced substantially parallel planes, and intersecting a common optical axis, the face of the foremost block constituting the light entry face of the assembly, said partial reflecting surfaces of the trapezoidal prism blocks inclined at an acute angle, a triangular prism having one end face abutting the end face of the second of said first-mentioned prisms and another end face abutting the adjacent face of the first of such prisms, a second triangular prism having a rear face, positioned in a plane extending substantially parallel to said other planes, and intersecting said axis, the front face of said last-mentioned prism abutting the adjacent face of the second of said pair of prisms, a partial light reflecting layer of material interposed between the latter pair of abutting faces and between the abutting faces of said first trapezoidal prism and the first-mentioned triangular prism, a pair of triangular prisms each having a face abutting a respective trapezoidal prism for adjusting the length of travel through glass of its respective outer ray and a rear face, positioned in a plane extending substantially parallel to said other planes with the respective optical axes of said last-mentioned faces being laterally spaced from said first axis, and a pair of adjustable rectangular compensator blocks adapted for adjusting the images of the outer light paths in the same plane as the middle image, each positioned adjacent the rear face of one of said last-mentioned triangular blocks and interposed in the path of light emerging from such rear faces whereby each of the compensator blocks is adapted to be adjusted so that the images of the outer light paths are in the same plane as the middle image.

9. An assembly for use with a lens and adapted for producing color separation images comprising a bottom base piece, a bottom plate, a bottom spacer block interposed between said base piece and plate, a top plate, a relatively fixed prism assembly operatively positioned between said plates and adapted for the separation of light rays into three beams along parallel light paths, said prism assembly comprising a pair of generally trapezoidal prism blocks, each of said prism blocks including a partial light reflecting surface, one end face of each constituting the light entry face thereof, said blocks being arranged transversely to one another with said light entry faces extending in spaced substantially parallel planes, and intersecting a common optical axis, the face of the foremost block constituting the light entry face of the assembly, a triangular prism having one end face abutting the end face of the second of said first-mentioned prisms and forming a light emerging face and another end face abutting the partial light reflecting surface of the adjacent face of the first of such prisms, a second triangular prism having a rear face positioned in a plane extending substantially parallel to said other planes of the light entry faces, and intersecting said axis, the front face of said last-mentioned prism abutting the partial light reflecting surface of the adjacent face of the second of said pair of prisms, said partial light reflecting surfaces of said trapezoidal prism blocks formed by a partial light reflecting layer of material interposed between the latter pair of abutting faces and between the abutting faces of said first trapezoidal prism and the first-mentioned triangular prism, and a pair of triangular prisms each having a face abutting a respective trapezoidal prism and a rear face forming a light emerging face and positioned in a plane extending substantially parallel to said other planes of the light entry faces with the respective optical axes of said last-mentioned rear faces being laterally spaced from said first axis, spacer blocks positioned between said plates at either side of said prism assembly, a top piece overlying said top plate, means securing said elements together into a substantially rigid structure, a plurality of set screws threaded into said top piece and engageable with said top plate for applying pressure on the latter in a direction toward said prism assembly, said base piece provided with a pair of openings therein having parallel axes, and slots operatively connected to the openings to form clamping portions adjacent each of said openings, a pair of shank members, each pivotally mounted in a respective opening, resilient means operatively connected to the bottom spacer block and associated with the respective shank members tending to rotate the same about its pivotal axis, screw means carried by the bottom base piece and associated with each shank member opposing such pivotal movement thereof, screw means operatively carried by the bottom base piece and adapted for engaging the respective clamping portions for maintaining said shank members in any of their respective adjusted positions, a prism holder pivotally mounted on each of said shank members contiguous to the prism assembly and adapted for focusing the images of the outer light paths in the same plane as the middle image, a compensator prism mounted in each respective prism holder and in each of the outer light paths from the fixed prism assembly, each of the prism holders being rotatable relative to their respective shank members on an axis extending at right angles to and passing through the respective axes of said shank members, resilient means associated with each prism holder and the shank member carrying the same tending to rotate such holder about its pivotal axis, screw means associated with the respective holders and shank members opposing such pivotal movement of the holders, and each of said prism holders and shank members comprising complementally formed clamping means adapted for locking each prism holder in any of its adjusted positions relative to its respective shank member whereby each of the compensator prisms is adapted to be focused so that the images of the outer light paths are in the same plane as the middle image.

References Cited in the file of this patent

UNITED STATES PATENTS

| | | |
|---|---|---|
| 1,118,193 | Ferber | Nov. 24, 1914 |
| 1,307,598 | Phillips | June 24, 1919 |
| 1,320,625 | Kunz | Nov. 4, 1919 |
| 1,485,956 | Bredon | Mar. 4, 1924 |
| 1,849,473 | Berthon | Mar. 15, 1932 |
| 1,874,615 | Pilny | Aug. 30, 1932 |
| 1,975,141 | Fitz | Oct. 2, 1934 |
| 2,050,224 | Gilmore | Aug. 4, 1936 |
| 2,064,145 | Bonneau | Dec. 15, 1936 |
| 2,072,091 | Ball et al. | Mar. 2, 1937 |
| 2,073,368 | Fitz | Mar. 9, 1937 |
| 2,096,425 | Dixon et al. | Oct. 19, 1937 |
| 2,281,607 | Thomas | May 5, 1942 |
| 2,382,580 | Rackett | Aug. 14, 1945 |
| 2,444,512 | Kath | July 6, 1948 |

FOREIGN PATENTS

| | | |
|---|---|---|
| 485,456 | Great Britain | May 19, 1938 |